US009520131B2

(12) United States Patent
Hsiao et al.

(10) Patent No.: US 9,520,131 B2
(45) Date of Patent: Dec. 13, 2016

(54) APPARATUS AND METHOD FOR VOICE PROCESSING

(71) Applicant: Wistron Corporation, New Taipei (TW)

(72) Inventors: Hsi-Chun Hsiao, New Taipei (TW); Shou-Te Wei, New Taipei (TW)

(73) Assignee: Wistron Corporation, New Taipei (TW)

( * ) Notice: Subject to any disclaimer, the term of this patent is extended or adjusted under 35 U.S.C. 154(b) by 168 days.

(21) Appl. No.: 14/146,015

(22) Filed: Jan. 2, 2014

(65) Prior Publication Data

US 2014/0309994 A1    Oct. 16, 2014

(30) Foreign Application Priority Data

Apr. 11, 2013   (TW) .............................. 102112876 A (51) Int. Cl.
| | |
|---|---|
| G10L 15/20 | (2006.01) |
| G10L 11/00 | (2006.01) |
| G06F 21/32 | (2013.01) |
| H04N 21/43 | (2011.01) |
| G10L 15/25 | (2013.01) |
| G10L 25/78 | (2013.01) |

(52) U.S. Cl.
CPC ............. *G10L 15/25* (2013.01); *G10L 25/78* (2013.01)

(58) Field of Classification Search
CPC .......... G10L 11/00; G10L 15/20; G06F 21/32; H04N 21/43
USPC .......................... 704/233, 248, 270; 348/515
See application file for complete search history.

(56) References Cited

U.S. PATENT DOCUMENTS

| | | | | |
|---|---|---|---|---|
| 5,884,257 A | * | 3/1999 | Maekawa | ............... G10L 25/87 |
| | | | | 381/110 |
| 6,594,629 B1 | * | 7/2003 | Basu | ................. G06K 9/00228 |
| | | | | 704/233 |
| 7,675,539 B2 | | 3/2010 | Matsui | |

(Continued)

FOREIGN PATENT DOCUMENTS

| | | |
|---|---|---|
| CN | 202110564 | 1/2012 |
| TW | 200729083 | 8/2007 |
| TW | I302609 | 11/2008 |
| TW | I311286 | 6/2009 |
| TW | 201120469 | 6/2011 |

OTHER PUBLICATIONS

Bregler et al., "EIGENLIPS" for Robust Speech Recognition, IEEE, 1994.*

(Continued)

*Primary Examiner* — Pierre-Louis Desir
*Assistant Examiner* — Seong Ah A Shin
(74) *Attorney, Agent, or Firm* — Jianq Chyun IP Office (57) ABSTRACT

An apparatus and a corresponding method for voice processing are provided. The apparatus includes a sound receiver, a camera, and a processor. The sound receiver receives a sound signal. The camera takes a video. The processor is coupled to the sound receiver and the camera. The processor obtains a voice onset time (VOT) of the sound signal, detects a human face in the video, detects a change time of a mouth contour of the human face, and verifies at least one preset condition. When all of the preset conditions are true, the processor performs speech recognition on the sound signal. The at least one preset condition includes that a difference between the VOT and the change time is smaller than a threshold value.

12 Claims, 6 Drawing Sheets

(56) References Cited

U.S. PATENT DOCUMENTS

| | | | |
|---|---|---|---|
| 7,792,326 B2 | 9/2010 | Lin | |
| 2003/0018475 A1* | 1/2003 | Basu | G06K 9/00228 704/270 |
| 2006/0224382 A1* | 10/2006 | Taneda | G10L 15/25 704/233 |
| 2006/0293887 A1* | 12/2006 | Zhang | G10L 21/0208 704/233 |
| 2008/0037837 A1* | 2/2008 | Noguchi | G06K 9/00335 382/118 |
| 2011/0135102 A1 | 6/2011 | Huang et al. | |
| 2013/0141643 A1* | 6/2013 | Carson | H04N 21/4307 348/515 |
| 2014/0067679 A1* | 3/2014 | O'Reilly | G06F 21/32 705/44 |
| 2015/0213604 A1* | 7/2015 | Li | G06T 13/40 345/473 |

OTHER PUBLICATIONS

Iwano et al., "Audio-Visual Speech Recognition Using Lip Information Extracted from Side-Face Images", EURASIP Journal on Audio, 2007, Speech, and Music Processing, p. 1-9.*

Bregler et al., ""Eigenlips" for robust speech recognition." Acoustics, Speech, and Signal Processing, 1994. ICASSP-94., 1994 IEEE International Conference on. vol. 2. IEEE, 1994.*

"Office Action of Taiwan Counterpart Application," issued on Dec. 11, 2014, with English translation thereof, p. 1-p. 7.

Koji Iwano et al., "Audio-Visual Speech Recognition Using Lip Information Extracted from Side-Face Images", EURASIP Journal on Audio, Speech, and Music Processing, Dec. 2007, pp. 1-9.

"Office Action of China Counterpart Application" with partial English translation, issued on Aug. 29, 2016, pp. 1-42, in which the listed references were cited.

* cited by examiner

APPARATUS AND METHOD FOR VOICE PROCESSING

CROSS-REFERENCE TO RELATED APPLICATION

This application claims the priority benefit of Taiwan application serial no. 102112876, filed on Apr. 11, 2013. The entirety of the above-mentioned patent application is hereby incorporated by reference herein and made a part of this specification.

BACKGROUND

Technical Field

The disclosure relates to a voice processing apparatus and a method for voice processing. Particularly, the disclosure relates to an apparatus and a method for recognizing voice of a user and ambient noise.

Related Art

Speech recognition technique is to use a processor to compare a sound signal of a voice instruction with data of an inbuilt database after receiving the voice instruction from a user through a microphone, so as to output a closest result.

Figure 1:
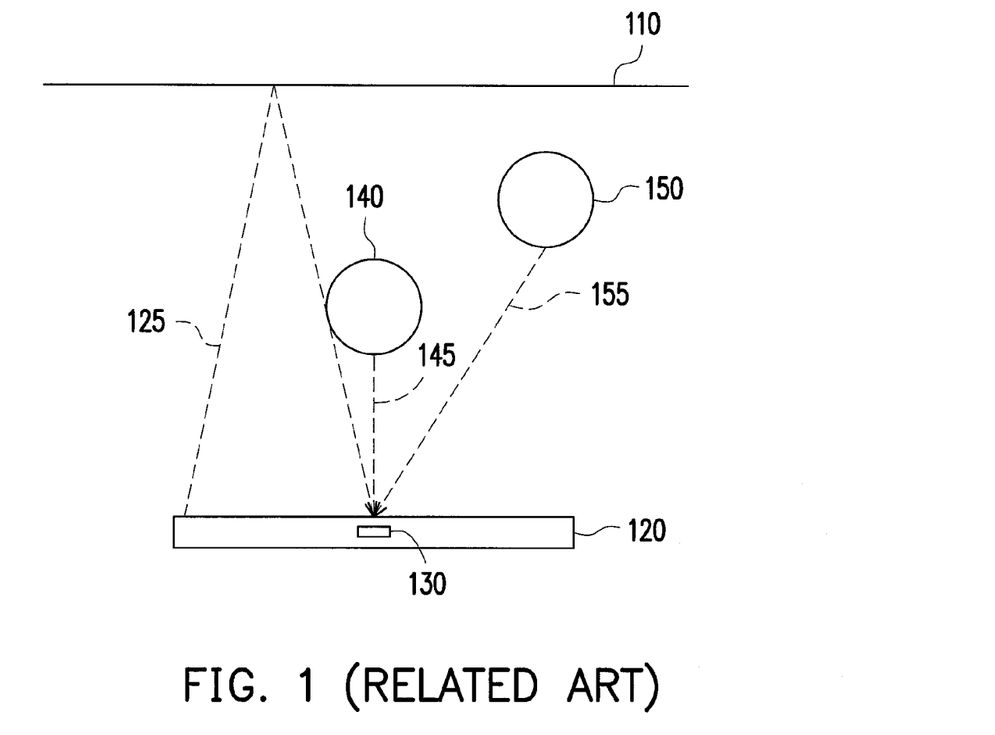
FIG. 1 is a schematic diagram of ambient noise interference.

According to the current speech recognition technique, the voice instruction can be correctly recognized in case of no ambient noise. However, the received sound cannot be controlled, namely, both of the voice instruction of the user and the ambient notice are received for recognition. As shown in FIG. 1, a television 120 can receive a voice instruction 145 from a user 140 through a microphone 130. However, the microphone 130 not only receives the voice instruction 145 from the user 140, but also receives a sound signal 125 sent by the television 120 itself and reflected by a wall 110, and receives a voice 155 from a passer-by 150. The sound signal 125 sent by the television 120 and the voice 155 of the passer-by 150 are all ambient noises.

In case that the ambient noise exists, the voice instruction is probably mixed and interfered by the ambient noise, and whether the voice instruction can be recognized is unknown. Especially, the voice of the passer-by and the voice instruction of the user are hard to be distinguished, which is one of the main reasons to cause recognition error.

Therefore, it is important to resolve the interference of the ambient noise in the speech recognition field.

SUMMARY

The disclosure is directed to a voice processing apparatus and a method for voice processing, in which a sound and a video are used to position a voice source to eliminate interference of ambient noise, so as to correctly recognize a voice instruction of a user.

The disclosure provides a voice processing apparatus including a sound receiver, a camera, and a processor. The sound receiver receives a sound signal. The camera takes a video. The processor is coupled to the sound receiver and the camera. The processor obtains a voice onset time (VOT) of the sound signal, detects a human face in the video, detects a change time of a mouth contour of the human face, and verifies at least one preset condition. When the at least one preset condition is all true, the processor performs speech recognition on the sound signal. The at least one preset condition includes that a difference between the VOT and the change time is smaller than a threshold value.

The disclosure provides a method for voice processing, which includes following steps. A sound signal is received. A voice onset time (VOT) of the sound signal is obtained. A video is taken. A human face in the video is detected. A change time of a mouth contour of the human face is detected. At least one preset condition is verified. When the at least one preset condition is all true, speech recognition is performed on the sound signal. The at least one preset condition includes that a difference between the VOT and the change time is smaller than a threshold value.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 2:
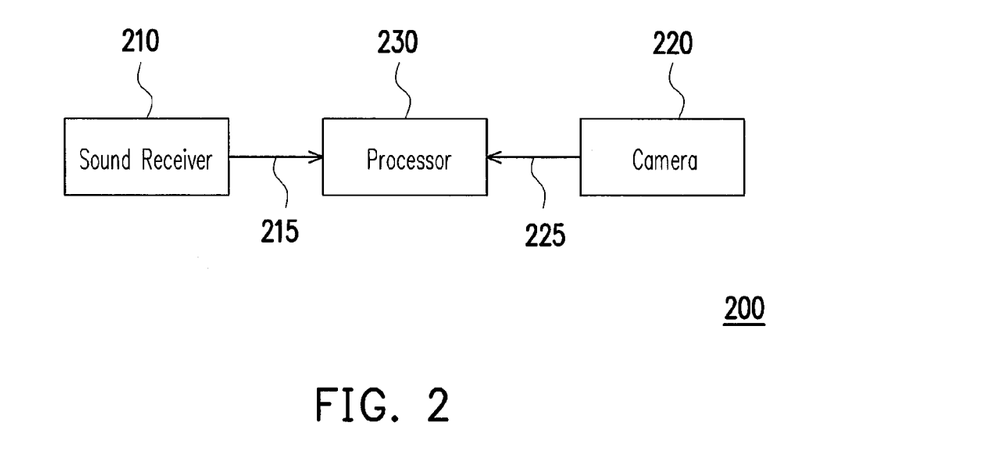
FIG. 2 is a schematic diagram of a voice processing apparatus according to an embodiment of the disclosure.

FIG. 2 is a schematic diagram of a voice processing apparatus 200 according to an embodiment of the disclosure. The voice processing apparatus 200 can be any electronic apparatus capable of receiving a voice instruction of a user for operation, for example, a smart phone, a personal digital assistant (PDA), a tablet computer, a notebook, a personal computer, or various smart home appliances. The voice processing apparatus 200 includes a sound receiver 210, a camera 220, and a processor 230. The processor 230 is coupled to the sound receiver 210 and the camera 220.

Figure 3:
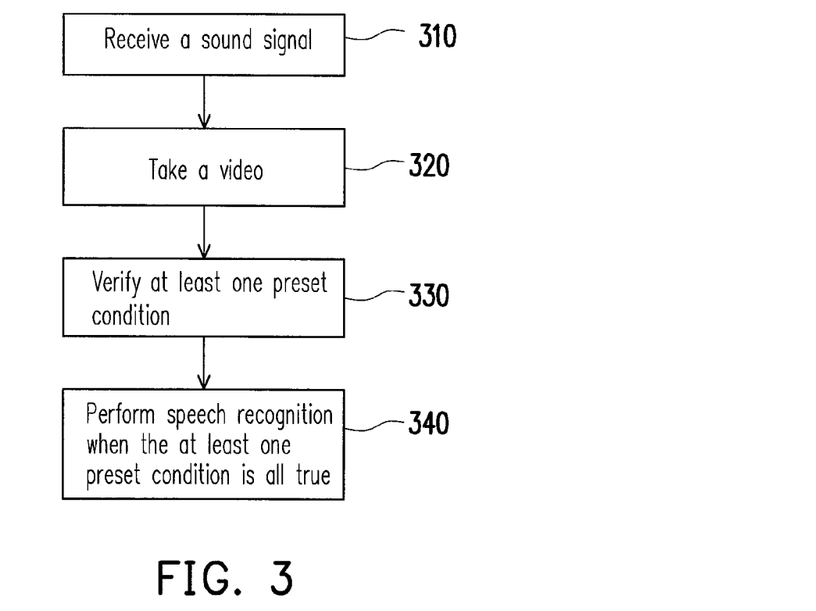
FIG. 3, FIG. 4 and FIG. 5 are flowcharts illustrating methods for voice processing according to an embodiment of the disclosure.

FIG. 3 is a flowchart illustrating a method for voice processing according to an embodiment of the disclosure. The method is executed by the voice processing apparatus 200. In step 310, the sound receiver 210 receives a sound signal 215. In step 320, the camera 220 takes a video 225. In step 330, the processor 230 verifies at least one preset condition, where the at least one preset condition relates to the sound signal 215 and the video 225. When the at least one preset condition is all true, in step 340, the processor 230 performs speech recognition on the sound signal 215.

Figure 4:
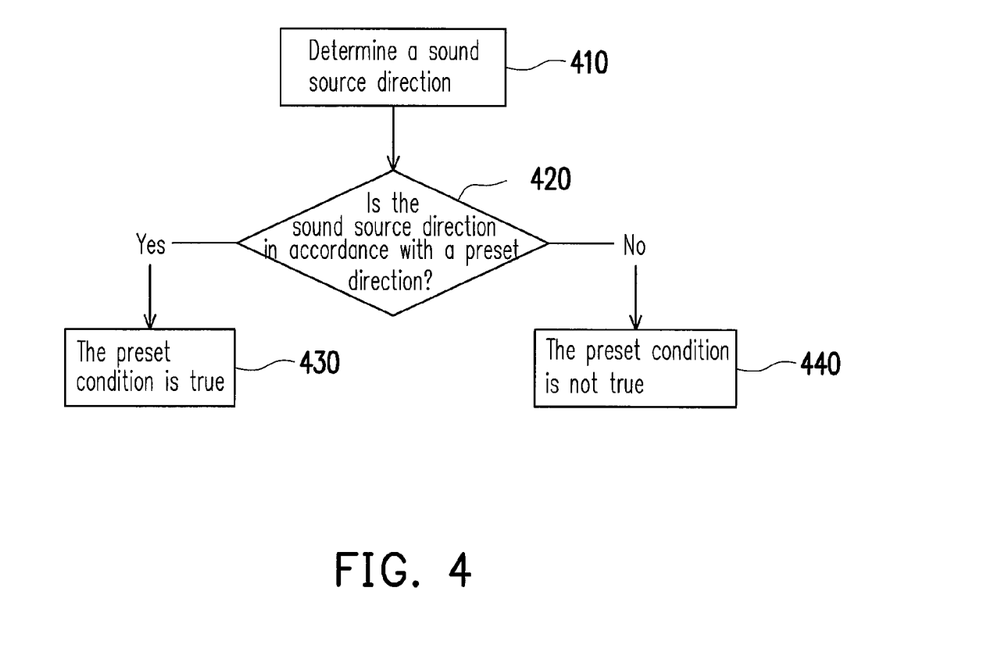

FIG. 4 is a flowchart illustrating a method for voice processing according to an embodiment of the disclosure. The method flow of FIG. 4 is a method for verifying one of the preset conditions of the step 330, and the preset condition verified in the method flow of FIG. 4 is that the sound signal 215 has to come from a preset direction. The step 330 includes the method flow of FIG. 4, and the method flow of FIG. 4 can be executed by the processor 230.

The method flow of FIG. 4 is described as follows. First, in step 410, a sound source direction (or a direction angle) of the sound signal 215 is determined, where the method of determining the sound source direction is described with reference of FIG. 6. In step 420, it is verified whether the sound source direction is in accordance with a preset direction, and if yes, in step 430, it is determined that the preset condition verified in the method flow of FIG. 4 is true, and if not, in step 440, it is determined that the preset condition verified in the method flow of FIG. 4 is not true.

The preset direction relates to an expected position where the user locates when the user operates the voice processing apparatus 200. For example, if the voice processing device 200 is a television, the user will perform operations in front of the television, so that the aforementioned preset direction can be set to a right front direction of the television. The aforementioned accordance refers to that an angle difference between the sound source direction of the sound signal 215 and the aforementioned preset direction is smaller than a threshold value, for example, the angle difference has to be smaller than 5 degrees. The limitation of the angle difference can be one of the preset conditions verified in the step 330.

Figure 5:
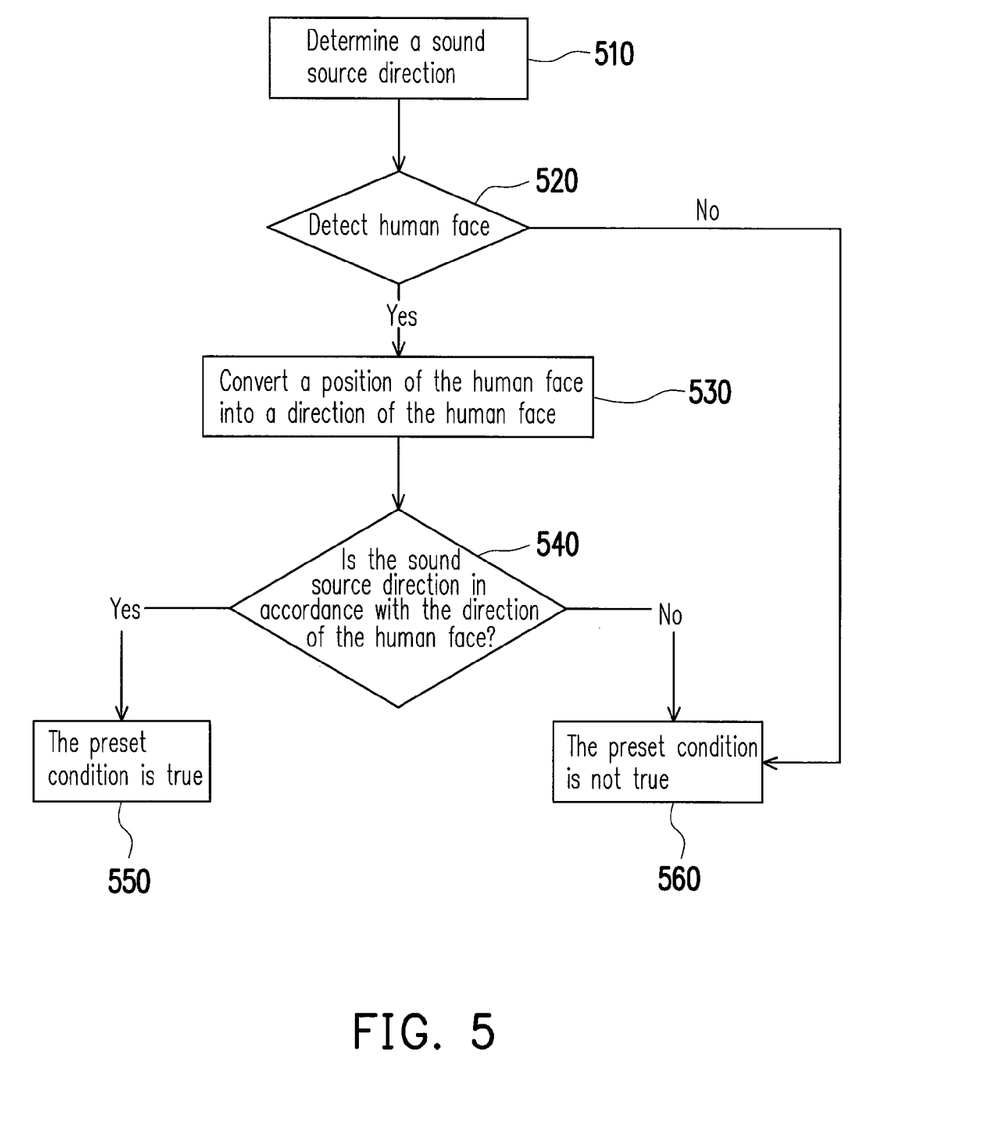

FIG. 5 is a flowchart illustrating a method for voice processing according to an embodiment of the disclosure. The method flow of FIG. 5 is a method for verifying one of the preset conditions of the step 330, and the preset condition verified in the method flow of FIG. 5 is that the sound source direction of the sound signal 215 has to be in accordance with a direction aligned with the human face of the user. The step 330 includes the method flow of FIG. 5, and the method flow of FIG. 5 can be executed by the processor 230.

The method flow of FIG. 5 is described as follows. First, in step 510, a sound source direction of the sound signal 215 is determined, where the method of determining the sound source direction is described with reference of FIG. 6. The sound signal 215 comes from a user 630, and the sound signal 215 includes two sound signals 631 and 632. A front surface of the voice processing apparatus 200 is indicated as 650. The sound receiver 210 includes two microphones 651 and 652, where the microphones 651 and 652 respectively receive the sound signals 631 and 632. The processor 230 can determine a direction angle 636 of the sound signal 215 according to a time difference or phase difference 635 between the sound signals 631 and 632.

Figure 6:
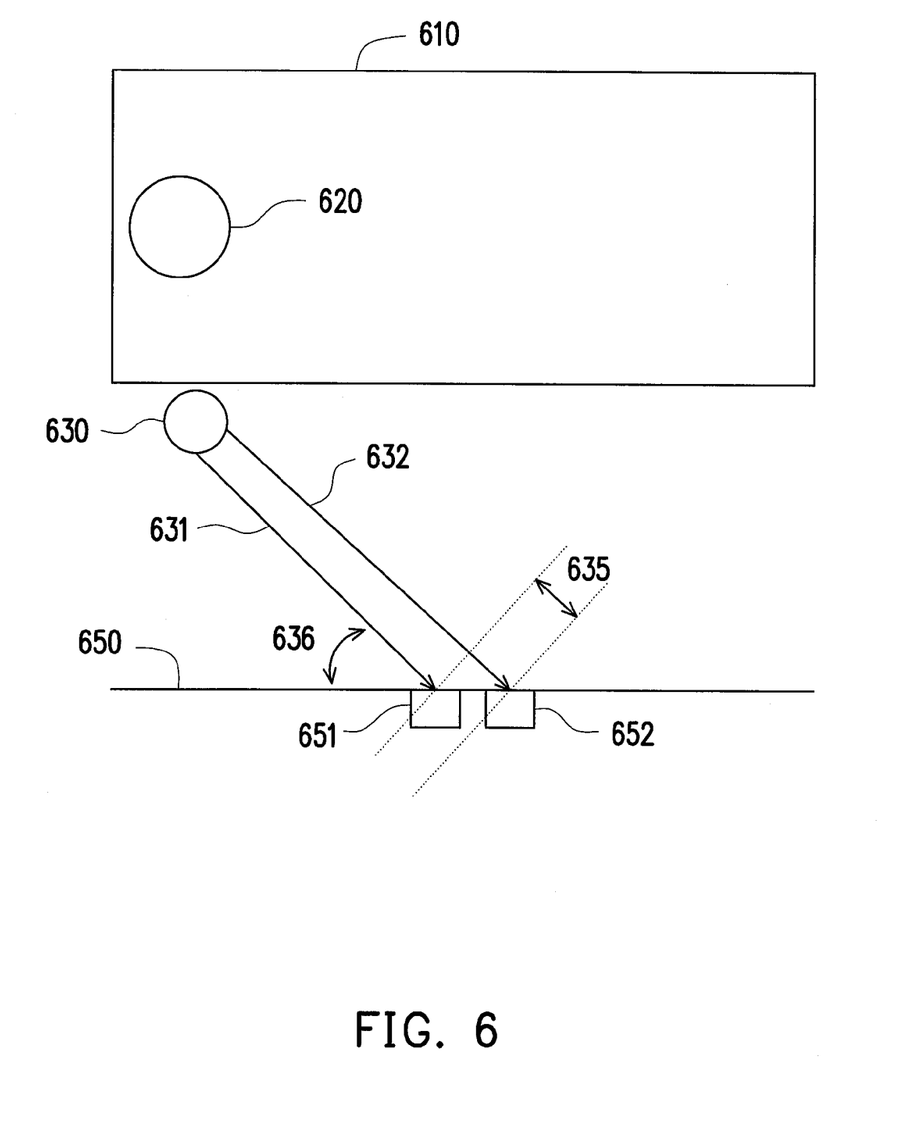
FIG. 6 is a schematic diagram of determining a sound source direction according to an embodiment of the disclosure.

For example, the processor 230 performs a signal shift operation on the sound signals 631 and 632 received by the microphones 651 and 652, and detects an overlapping time point of two strongest signals of the sound signals 631 and 632, and calculates a present shift amount to obtain the time difference or phase difference 635 between the sound signals 631 and 632, so as to obtain the direction angle 636 of the sound signal 215. It is a known technique to calculate the sound source direction according to the time difference or phase difference between a plurality of sound signals, and details thereof are not repeated.

Then, in step 520, it is detected whether a frame in the video 225 has a human face, and the human face is probably the user's face. It is a known technique to detect human face in the video frame, for example, a method of motion detection, skin color detection, or model detection can be used to obtain a position of the human face in the frame, and details thereof are not repeated. If the human face is not detected, a step 560 is executed, by which the preset condition verified in the method flow of FIG. 5 is determined to be not true. If the human face is detected, for example, a human face 620 in a frame 610 of the video 225 shown in FIG. 6 is detected, in step 530, a position of the human face in the frame of the video is converted into a direction of the human face according to a look-up table. For example, as that shown in FIG. 6, the human face 620 belongs to the users 630, and the direction angle of the human face 620 is 636.

The above look-up table can be created in advance, for example, a distance between an object and the voice processing apparatus 200 is limited to a fixed preset distance (for example, 3 meters), under such premise, by disposing the object at places corresponding to a plurality of different angles of the sound receiver 210, and comparing different positions of the object at different angles in the frame, and recording corresponding relationships of positions in the frame and direction angles, the look-up table of the direction angle and the position in the frame can be created.

Alternatively, the voice processing apparatus 200 can provide a correction procedure, and in the correction procedure, the user sends sounds at a plurality of positions capable of operating the voice processing apparatus 200. The processor 230 determines the sound source directions, and records a position of the user's face in the frame of the video 225 when the user locates at each of the above positions, and records a sound source direction of the sound signal 215 corresponding to each of the positions, and then creates the look-up table according to the corresponding relationships of the positions and the sound source directions.

The look-up table records a plurality of different positions in the frame, and directions corresponding to the positions. Therefore, in the step 530, the position of the human face appeared in the frame can be converted into a corresponding direction of the human face. If the user is talking, the direction of the user's face is the same to the sound source direction. Therefore, in step 540, it is determined whether the sound source direction of the sound signal 215 is in accordance with the direction of the human face. If yes, in step 550, the preset condition verified in the method flow of FIG. 5 is determined to be true. Conversely, in step 560, the preset condition verified in the method flow of FIG. 5 is determined to be not true. The aforementioned accordance refers to that an angle difference between the sound source direction of the sound signal 215 and the direction of the human face is smaller than a threshold value, for example, the angle difference has to be smaller than 5 degrees. The limitation of the angle difference can be one of the preset conditions verified in the step 330.

Figure 7:
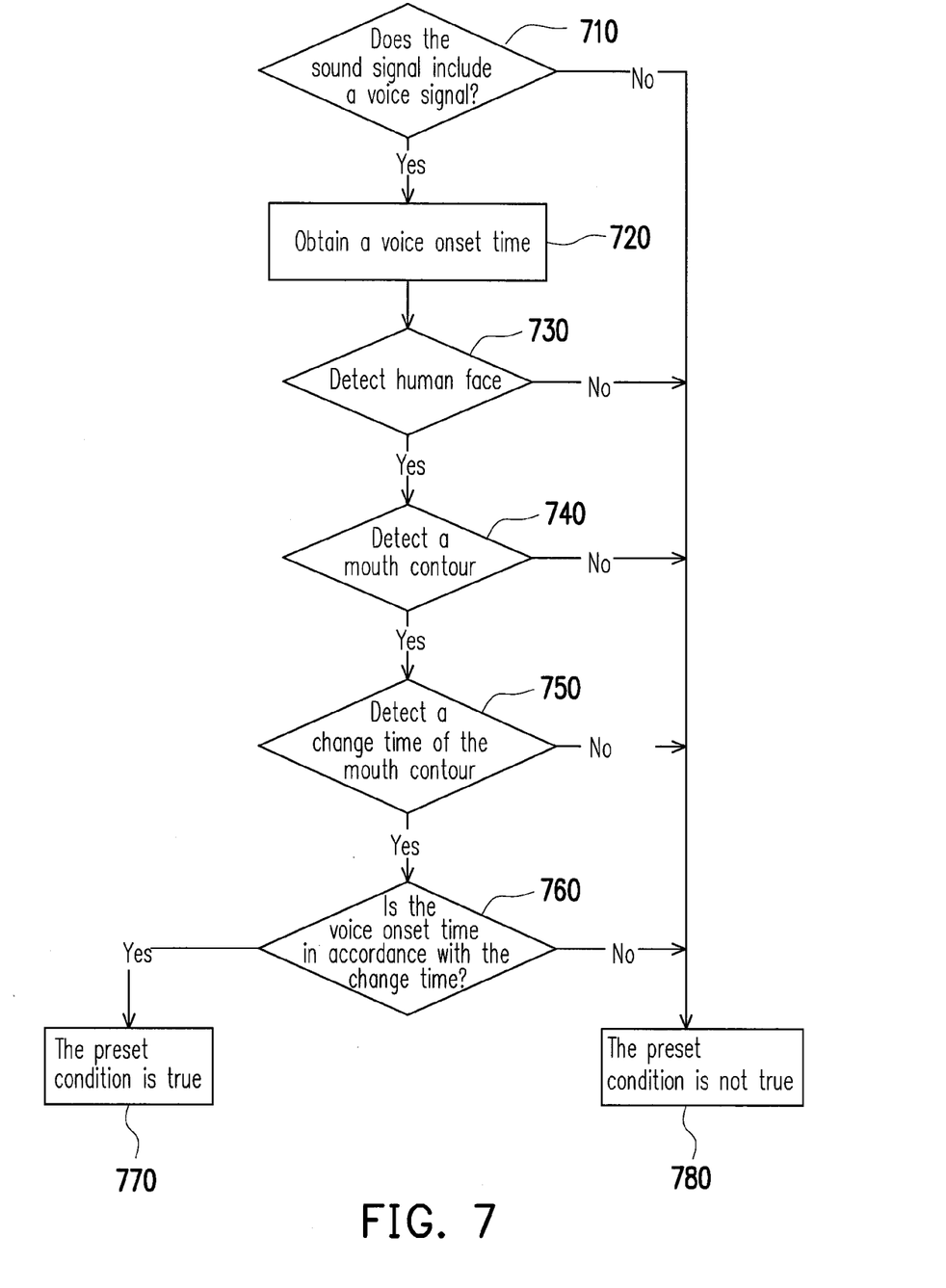
FIG. 7 is a flowchart illustrating a method for voice processing according to an embodiment of the disclosure.

FIG. 7 is a flowchart illustrating a method for voice processing according to an embodiment of the disclosure. The method flow of FIG. 7 is a method for verifying one of the preset conditions of the step 330, and the preset condition verified in the method flow of FIG. 7 is that a voice onset time (VOT) of the sound signal 215 has to be in accordance with a change time of a mouth contour of the human face in the frame. The step 330 includes the method flow of FIG. 7, and the method flow of FIG. 7 can be executed by the processor 230.

The method flow of FIG. 7 is described below. First, in step 710, it is determined whether the sound signal 215 includes a voice signal. If the sound signal 215 does not include the voice signal, it represents that the sound signal 215 is a pure ambient noise, and a step 780 is executed, by which the preset condition verified in the method flow of FIG. 5 is determined to be not true. If the sound signal 215 includes the voice signal, a step 720 is executed, by which the VOT of the sound signal 215 is obtained.

For example, in the step 710, a VOT detection is performed on the sound signal 215 to determine whether the sound signal 215 includes the voice signal. The VOT detection is a known technique, in brief, spectrum characteristics such as distribution of mel-frequency cepstral coefficients (MFCCs), energy, zero-crossing rate, pitch contour, etc. are used to detect the VOT of the sound signal for separating with a general non-voice sound signal. If the sound signal 215 includes the voice signal, the VOT detection can be performed to obtain the VOT of the sound signal 215.

The method flow of FIG. 7 is further described below. In step 730, it is detected whether the video 225 has a human face. If the human face is not detected, the step 780 is executed, by which the preset condition verified in the method flow of FIG. 7 is determined to be not true. If the human face is detected, in step 740, it is detected whether the human face has a mouth contour. For example, active shape models (ASMs) and active appearance models (AAMs) can be used to detect the mouth contour. The ASMs and AAMs are known techniques, and details thereof are not repeated.

If the mouth contour is not detected in the step 740, the step 780 is executed, by which the preset condition verified in the method flow of FIG. 7 is determined to be not true. Conversely, if the mouth contour is detected, in step 750, a change time of the mouth contour is detected.

Figure 8:
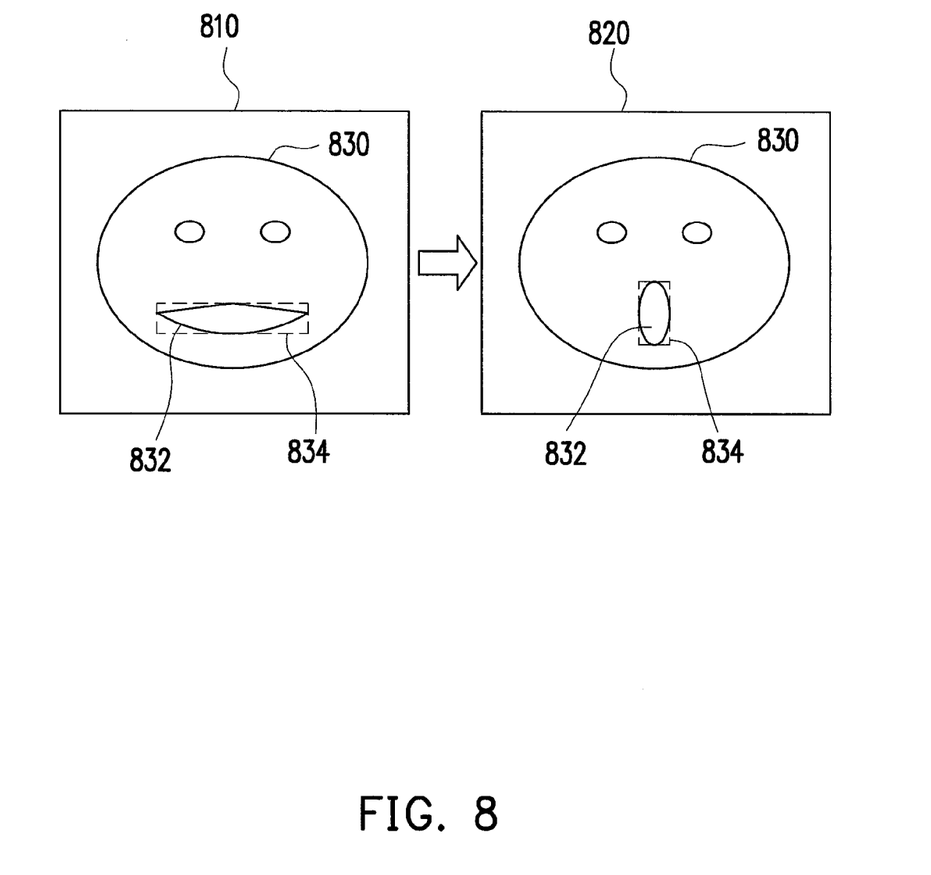
FIG. 8 is a schematic diagram of detecting change of a mouth contour according to an embodiment of the disclosure.

Detection of the change time of the mouth contour can be as that shown in FIG. 8. In the example of FIG. 8, a user 830 appears in two different frames 810 and 820 of the video 225. The processor 230 can detect a change amount between the mouth contours 832 of the user 830 in the frames 810 and 820, where the change amount can be a change amount in area, height or width of the mouth contours 832. Alternatively, the processor 230 may detect the circumscribing quadrangles 834 of the mouth contours 832, and take a change amount between areas, heights, or widths of the circumscribing quadrangles 834 as the aforementioned change amount of the mouth contour 832.

If the mouth contours 832 in the frames 810 and 820 are not changed, or the change amount of the mouth contours 832 in the frames 810 and 820 is not greater than a predetermined threshold value, the mouth contour 832 is regarded to have no change, and the step 780 is executed, by which the preset condition verified in the method flow of FIG. 7 is determined to be not true. If the change amount of the mouth contours 832 in the frames 810 and 820 is greater than the predetermined threshold value, the change time of the mouth contour 832 can be set to a time when the change amount is greater than the predetermined threshold value, and a step 760 is executed.

In the example of FIG. 8, the user 830 is talking, so that the mouth contours 832 and the circumscribing quadrangles 834 are obviously changed between the frames 810 and 820. If the sound signal 215 is a voice instruction of the user 830, the VOT of the sound signal 215 is synchronous to the change time of the mouth contour 832. Therefore, in the step 760, it is verified whether the VOT of the sound signal 215 is in accordance with the change time of the mouth contour 832. If yes, in step 770, the preset condition verified in the method flow of FIG. 7 is determined to be true, and if not, in the step 780, the preset condition verified in the method flow of FIG. 7 is determined to be not true. The aforementioned accordance refers to that a difference between the VOT of the sound signal 215 and the change time of the mouth contour 832 is smaller than a threshold value, for example, the time difference has to be smaller than 0.2 seconds. The limitation of the time difference can be one of the preset conditions verified in the step 330.

The method flows of FIG. 4, FIG. 5 and FIG. 7 are respectively verifications of different preset conditions. The preset condition verified in the step 330 may include one of or a plurality of preset conditions of FIG. 4, FIG. 5 and FIG. 7. The sound signal not complied with the preset condition can be regarded as an ambient noise and eliminated. When the preset conditions verified in the step 330 are all true, the sound signal 215 can be regarded as the user's voice, and the processor 230 performs speech recognition on the sound signal 215 in the step 340, so as to determine whether the sound signal 215 is a voice instruction. If the voice signal 215 is the voice instruction, the processor 230 executes the voice instruction.

In summary, in the voice processing apparatus and the method for voice processing of the disclosure, one or a plurality of preset conditions can be used to recognize the user's voice and the ambient noise, so as to eliminate the interference of the ambient noise to ensure only recognizing the user's voice.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A voice processing apparatus, comprising:
a sound receiver, receiving a sound signal;
a camera, taking a video; and
a processor, coupled to the sound receiver and the camera, obtaining a voice onset time of the sound signal, detecting a human face in the video, detecting a change time of a mouth contour of the human face, after detecting a change amount of the mouth contour between two frames of the video, and setting the change time as a time when the change amount is greater than a second threshold value, verifying at least one preset condition, and performing speech recognition on the sound signal when the at least one preset condition is all true, wherein the at least one preset condition comprises that a difference between the voice onset time and the change time is smaller than a first threshold value,
wherein the processor determines a sound source direction of the sound signal, and the at least one preset condition comprises that an angle difference between the sound source direction and a preset direction is smaller than a third threshold value.

2. The voice processing apparatus as claimed in claim 1, wherein the change amount is a change amount in area, height or width of the mouth contour.

3. The voice processing apparatus as claimed in claim 1, wherein the processor detects a circumscribing quadrangle of the mouth contour, and the change amount is a change amount in area, height or width of the circumscribing quadrangle.

4. The voice processing apparatus as claimed in claim 1, wherein the sound receiver comprises a first microphone and a second microphone, the sound signal comprises a first sound signal and a second sound signal, the first microphone and the second microphone respectively receive the first sound signal and the second sound signal, and the processor determines the sound source direction according to a time difference or a phase difference between the first sound signal and the second sound signal.

5. The voice processing apparatus as claimed in claim 1, wherein the processor determines a sound source direction of the sound signal, and converts a position of the human face in a frame of the video into a direction of the human face according to a look-up table, and the at least one preset condition comprises that an angle difference between the sound source direction and the direction of the human face is smaller than a fourth threshold value.

6. The voice processing apparatus as claimed in claim 5, wherein the processor records a plurality of positions of the human face in frames of the video and the sound source direction corresponding to each of the positions, so as to establish the look-up table.

7. A method for voice processing, comprising:
  receiving a sound signal;
  obtaining a voice onset time of a sound signal;
  taking a video;
  detecting a human face in the video;
  detecting a change time of a mouth contour of the human face;
  detecting a change amount of the mouth contour between two frames of the video;
  setting the change time as a time when the change amount is greater than a second threshold value;
  verifying at least one preset condition;
  performing speech recognition on the sound signal when the at least one preset condition is all true, wherein the at least one preset condition comprises that a difference between the voice onset time and the change time is smaller than a first threshold value; and
  determining a sound source direction of the sound signal, wherein the at least one preset condition comprises that an angle difference between the sound source direction and a preset direction is smaller than a third threshold value.

8. The method for voice processing as claimed in claim 7, wherein the change amount is a change amount in area, height or width of the mouth contour.

9. The method for voice processing as claimed in claim 7, wherein the step of detecting the change amount of the mouth contour comprises:
  detecting a circumscribing quadrangle of the mouth contour, wherein the change amount is a change amount in area, height or width of the circumscribing quadrangle.

10. The method for voice processing as claimed in claim 7, wherein the sound signal comprises a first sound signal and a second sound signal, and the step of determining the sound source direction comprises:
  determining the sound source direction according to a time difference or a phase difference between the first sound signal and the second sound signal.

11. The method for voice processing as claimed in claim 7, further comprising:
  determining a sound source direction of the sound signal; and
  converting a position of the human face in a frame of the video into a direction of the human face according to a look-up table, wherein the at least one preset condition comprises that an angle difference between the sound source direction and the direction of the human face is smaller than a fourth threshold value.

12. The method for voice processing as claimed in claim 11, further comprising:
  recording a plurality of positions of the human face in frames of the video, and the sound source direction corresponding to each of the positions, so as to establish the look-up table.

* * * * *